US008608259B2

(12) United States Patent
Wu et al.

(10) Patent No.: US 8,608,259 B2
(45) Date of Patent: Dec. 17, 2013

(54) HOUSING OF ELECTRONIC DEVICE

(75) Inventors: Wei Wu, Shenzhen (CN); Xin Yang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 288 days.

(21) Appl. No.: 13/206,807

(22) Filed: Aug. 10, 2011

(65) Prior Publication Data

US 2012/0068589 A1    Mar. 22, 2012

(30) Foreign Application Priority Data

Sep. 17, 2010    (CN) .......................... 2010 1 0284983

(51) Int. Cl.
*H05K 5/02* (2006.01)

(52) U.S. Cl.
USPC ..................... 312/223.2; 361/679.58; 361/727

(58) Field of Classification Search
USPC ............ 312/223.1, 223.2, 257.1, 265.6, 216, 312/217, 218; 292/137, 138, 146, 150; 361/679.02, 679.6, 679.58, 724, 725, 361/726, 727
See application file for complete search history.

(56) References Cited

U.S. PATENT DOCUMENTS

| | | | | |
|---|---|---|---|---|
| 6,157,532 A * | 12/2000 | Cook et al. | ............... | 361/679.57 |
| 6,375,287 B1 * | 4/2002 | Lai | .............. | 312/223.2 |
| 6,398,325 B1 * | 6/2002 | Chen et al. | ............... | 312/223.2 |
| 6,775,144 B2 * | 8/2004 | Gan et al. | ...................... | 361/727 |
| 7,539,010 B2 * | 5/2009 | Chen et al. | .............. | 361/679.55 |
| 7,758,133 B2 * | 7/2010 | Chen et al. | ................. | 312/223.2 |
| 2002/0167790 A1 * | 11/2002 | Gan | .............................. | 361/683 |
| 2004/0080916 A1 * | 4/2004 | Hsu et al. | ...................... | 361/727 |
| 2005/0023943 A1 * | 2/2005 | Fan et al. | .................. | 312/223.2 |
| 2008/0239647 A1 * | 10/2008 | Luo et al. | ...................... | 361/683 |
| 2010/0089604 A1 * | 4/2010 | Tang | .............................. | 174/50 |
| 2011/0012483 A1 * | 1/2011 | Tang et al. | ................. | 312/223.2 |

* cited by examiner

*Primary Examiner* — James O Hansen
(74) *Attorney, Agent, or Firm* — Altis Law Group, Inc.

(57) ABSTRACT

A housing includes a main body, a cover coverable on the main body, and a latching mechanism for latching the cover to the main body. The main body defines at least one elongated hole. The cover defines at least one latching hole corresponding to the at least one elongated hole. The latching mechanism includes a driving member and a latching member coupled to the driving member. The driving member is rotatable around an axis A and drives the latching member sliding between a first position away from the axis A to a second position adjacent to the axis A. When the latching member is driven to slide to the first position, the latching member is detachable from the at least one latching hole, and the cover is unlatched from the main body; when the latching member is driven to slide to the second position, the latching member is latched to the at least one latching hole, and the cover is latched to the main body.

20 Claims, 5 Drawing Sheets

HOUSING OF ELECTRONIC DEVICE

BACKGROUND

1. Technical Field

The present disclosure relates to housings of electronic devices.

2. Description of Related Art

Many electronic devices include a main body and a cover fixed to the main body by a plurality of fixing members, such as bolts or screws. However, it is time consuming to assemble and dissemble the cover and the main body when bolts or screws are used.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of a housing and a computer housing using the same. Moreover, in the drawings, like reference numerals designate corresponding parts throughout several views.

DETAILED DESCRIPTION

Figure 1:
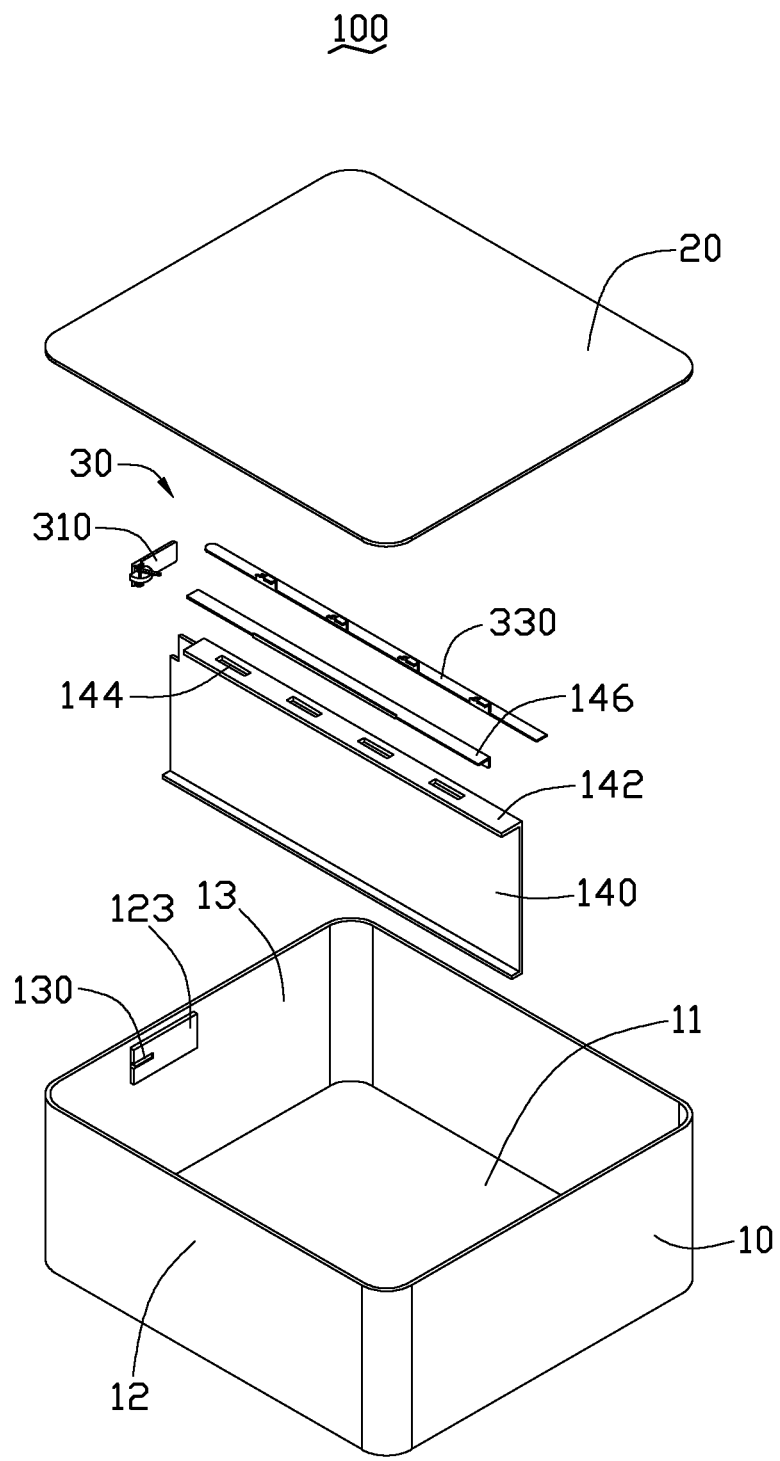
FIG. 1 is a partially disassembled perspective view of a housing of an electronic device in accordance with one embodiment.
Figure 2:
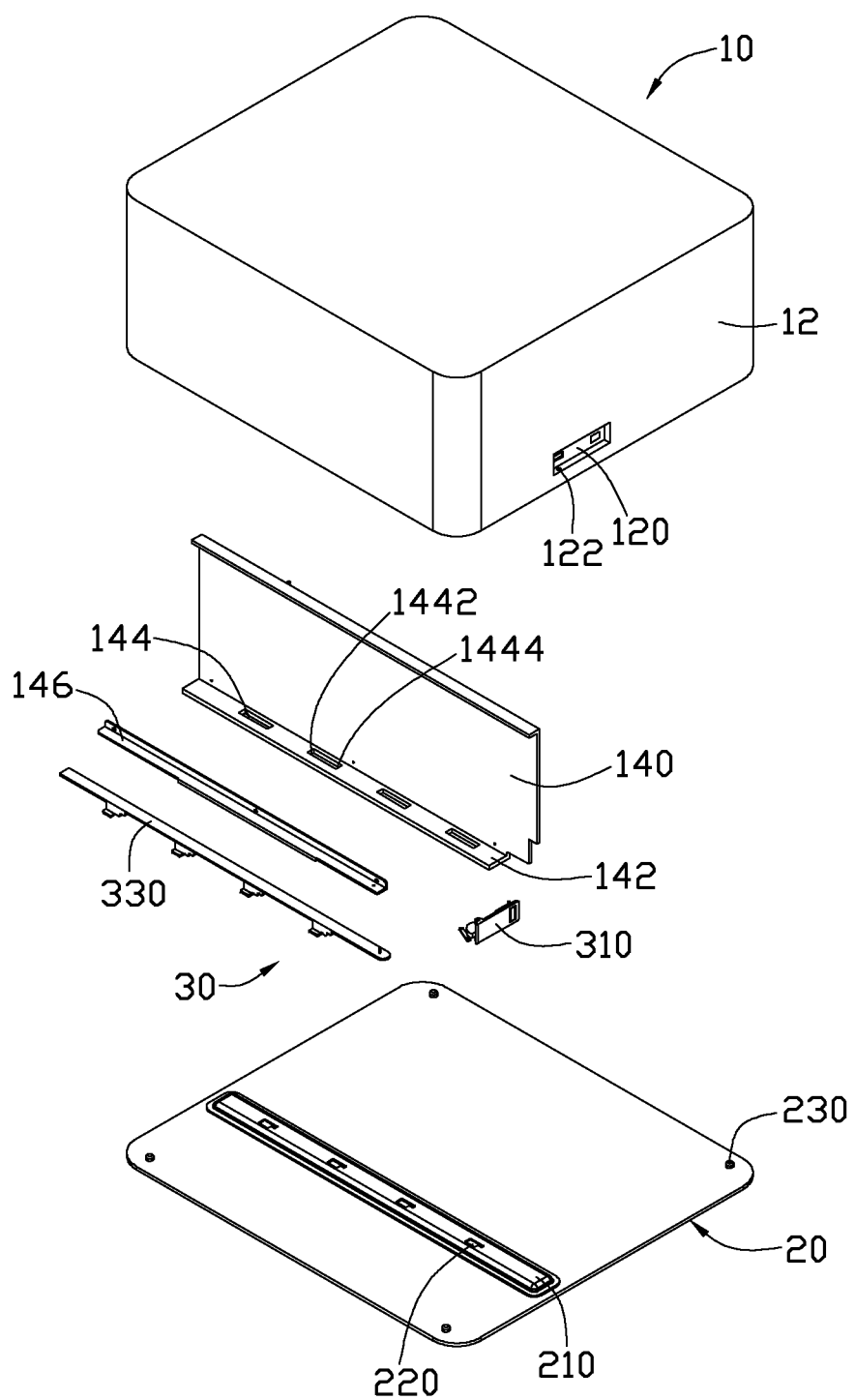
FIG. 2 is similar to FIG. 1, but viewed from another aspect.

Referring to FIGS. 1 and 2, a housing 100 of an electronic device in accordance with an embodiment is shown. The housing 100 includes a main body 10, a cover 20 coverable on the main body 10, and a latching mechanism 30 for latching the cover 20 to the main body 10.

The main body 10 includes a base 11 and four sidewalls 12 protruding from four sides of the base 11. The four sidewalls 12 serially interconnect and cooperate with the base 11 to define a receiving space 13 for receiving motherboard, processor, hard disk, and other components (not shown) and for operating the electronic device therein. An outer surface of a sidewall 12 (hereinafter, the first sidewall 12) of the main body 10 defines a receiving portion 120. When viewed from an inner side of the first sidewall 12, the receiving portion 120 protrudes from the inner surface of the first sidewall 12, while viewed from an outer side of the first sidewall 12, the receiving portion 120 is recessed into the outer surface of the first sidewall 12. An end of the bottom of the receiving portion 120 defines an elongated slot 130. The elongated slot 130 communicates with the receiving space 13 and extends in a direction parallel to the base 11. Two axis holes 122 are respectively defined at opposite sides of the receiving portion 120 and are arranged adjacent to the slot 130.

The main body 10 further includes a fixing plate 140 and a limiting plate 146 mounted to the fixing plate 140. The fixing plate 140 is accommodated in the receiving space 13 and divides the receiving space 13 into two parts. The fixing plate 140 is arranged perpendicular to the base 11 with opposite ends of the fixing plate 140 perpendicularly secured to the first sidewall 12 and the other sidewall opposite to the first sidewall 12 respectively. An end of the fixing plate 140 resists against the middle portion of the receiving portion 120 and is adjacent to an end of the slot 130 located at the middle of the receiving portion 120. A rim of the fixing plate 140 away from the base 11 is perpendicularly bent to form a positioning portion 142. A plurality of elongated holes 144 are evenly spaced and defined in the positioning portion 142. Each elongated hole 144 includes a first end 1442 away from the first sidewall 12 and a second end 1444 opposite to the first end 1442.

The limiting plate 146 is substantially L-shaped, and is mounted to the fixing plate 140. The limiting plate 146 is arranged parallel to the positioning portion 142, and keeps a distance from the positioning portion 142. Thus, when the limiting plate 146 is fixed to the fixing plate 140, an elongated guiding slot (not labeled) is defined between the limiting plate 146 and the positioning portion 142.

The cover 20 is substantially rectangular-shaped, and is coverable on the main body 10. The size of the cover 20 is substantially equal to that of the base 11. The cover 20 includes an elongated retaining member 210. The retaining member 210 is secured to the cover 20 and corresponds to the positioning portion 142. The middle portion of the retaining member 210 recesses to define an elongated groove (not shown) extending longitudinally, such that a clearance (not shown) is formed between the retaining member 210 and the cover 20 when the retaining member 210 is secured to the inner surface of the cover 20. A plurality of latching holes 220 are evenly spaced and defined in the retaining member 210. The latching holes 220 communicate with the clearance and respectively correspond to the elongated holes 144. Each latching hole 220 includes a narrow portion 222 and a wide portion 224 communicating with the narrow portion 222 (see FIG. 4).

Four protruding posts 230 respectively protrude from corners of the cover 20. The protruding posts 230 corresponds to and are received in four notches (not shown) of the main body 10, to limit the movement of the cover 20 in a plane parallel to the base 11.

Figure 3:
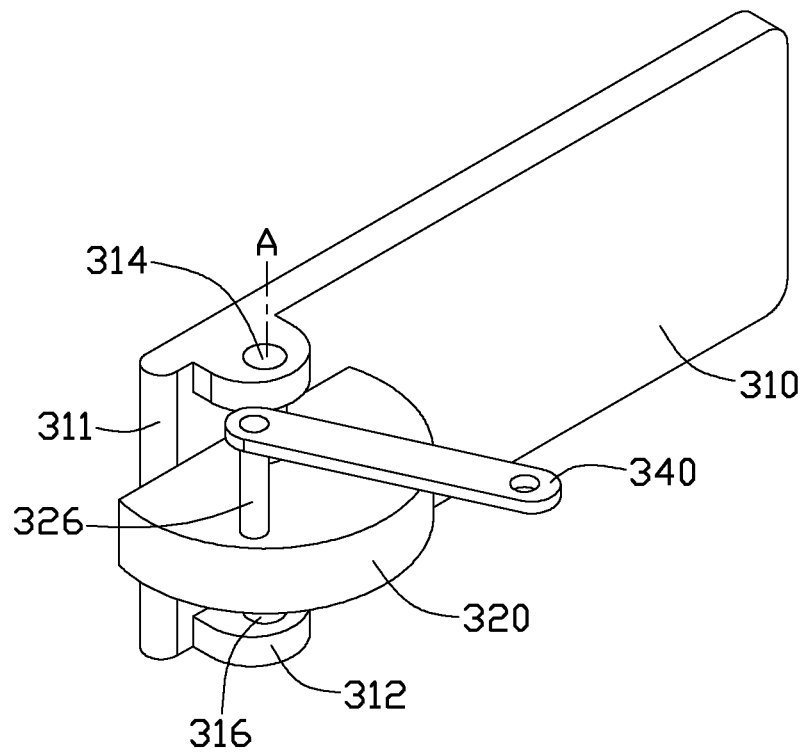
FIG. 3 is an enlarged view of an operating member shown in FIG. 1.

Referring to FIG. 3, the latching mechanism 30 includes an operating member 310, a driving member 320 fixed to the operating member 310, a latching member 330 (see FIG. 4), and a transmitting member 340 for connecting the latching member 330 with the driving member 320. The operating member 310 is rotatably received in the receiving portion 120, and is used to rotate the driving member 320 when being operated. The driving member 320 drives the latching member 330 to slide when being rotated by the operating member 310.

The operating member 310 is substantially rectangular-shaped. Two stands 312 are arranged at an end 311 of operating member 310. Each stand 312 defines a pivoting hole 314. A shaft rod 316 having an axis A is fixed to the stands 312 by being received in the pivoting holes 314. The shaft rod 316 is further rotatably received in the axis holes 122, whereby the operating member 310 is rotatably coupled to the main body 10.

The driving member 320 is substantially semicircular. The driving member 320 is fixed to the shaft rod 316 and is arranged between the stands 312. When the operating member 310 is operated, the driving member 320 moves with the operating member 310. A first post 326 protrudes from the driving member 320 and extends in a direction parallel to the axis A. The first post 326 is arranged adjacent to an arcuate rim of the driving member 320, such that the first post 326 is substantially off-center relative to the axis A. In the embodiment, the first post 326 and the end 311 are coplanar.

Figure 4:
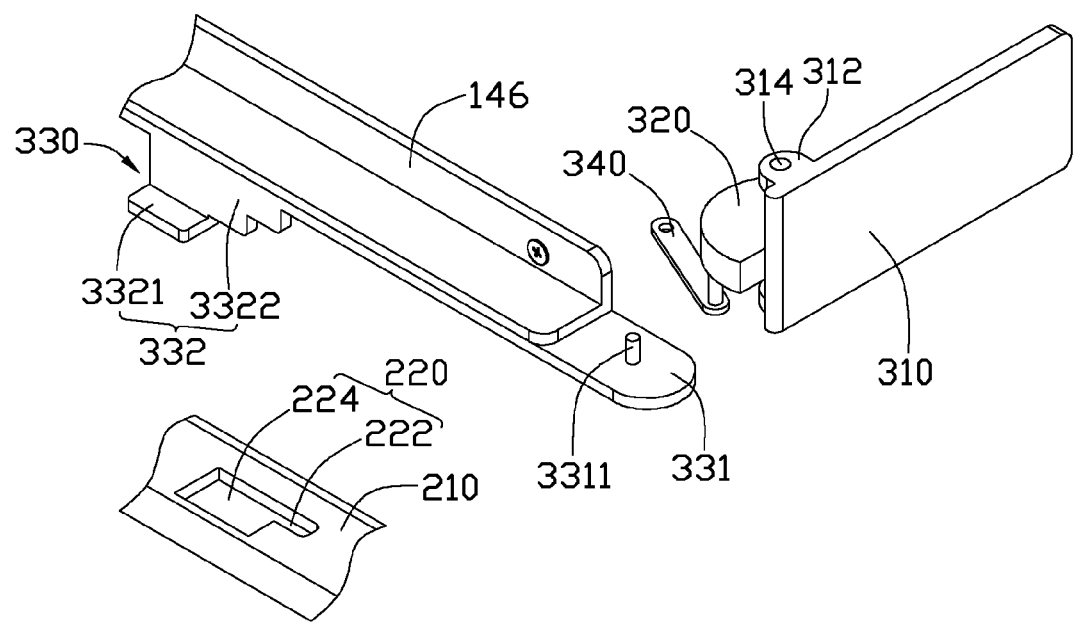
FIG. 4 is a partial, enlarged view of a latching member, retaining member, and the operating member shown in FIG. 1.

Referring also to FIG. 4, the latching member 330 is rotatably coupled to the driving member 320 by the transmitting member 340. The latching member 330 includes a guiding plate 331, and a plurality of hooking portions 332 (see FIG. 5). The latching member 330 is substantially strip-shaped. A second post 3311 protrudes from an end of the guiding plate 331. The hooking portions 332 are evenly arranged at a rim of the guiding plate 331 and correspond to the elongated holes 144. Each hooking portion 332 includes a hook 3321 and a connecting plate 3322 for connecting the hook 3321 to the guiding plate 331. The connecting plate 3322 is arranged perpendicularly at a rim of the guiding plate 331 and extends in a direction opposite to the second post 3311. The hook 3321 is perpendicularly arranged at an end of the connecting plate 3322 away from the guiding plate 331 and extends in a direction reverse to the guiding plate 331.

The size of the hooks 3321 is less than that of the wide portions 224 of the latching holes 220, such that the hooks 3321 are capable of extending through the corresponding wide portions 224. The thickness of the connecting plate 3322 are less than the width of the corresponding narrow portions 222, and the length of the connecting plates 3322 are less than the length of the corresponding latching holes 220. Thus, when the hooking portions 332 extends through the corresponding latching holes 220 with the connecting plate 3322 sliding against an end of the narrow portion 222 opposite to the wide portion 224, the hooks 3321 are latched to the retaining member 210.

Figure 5:
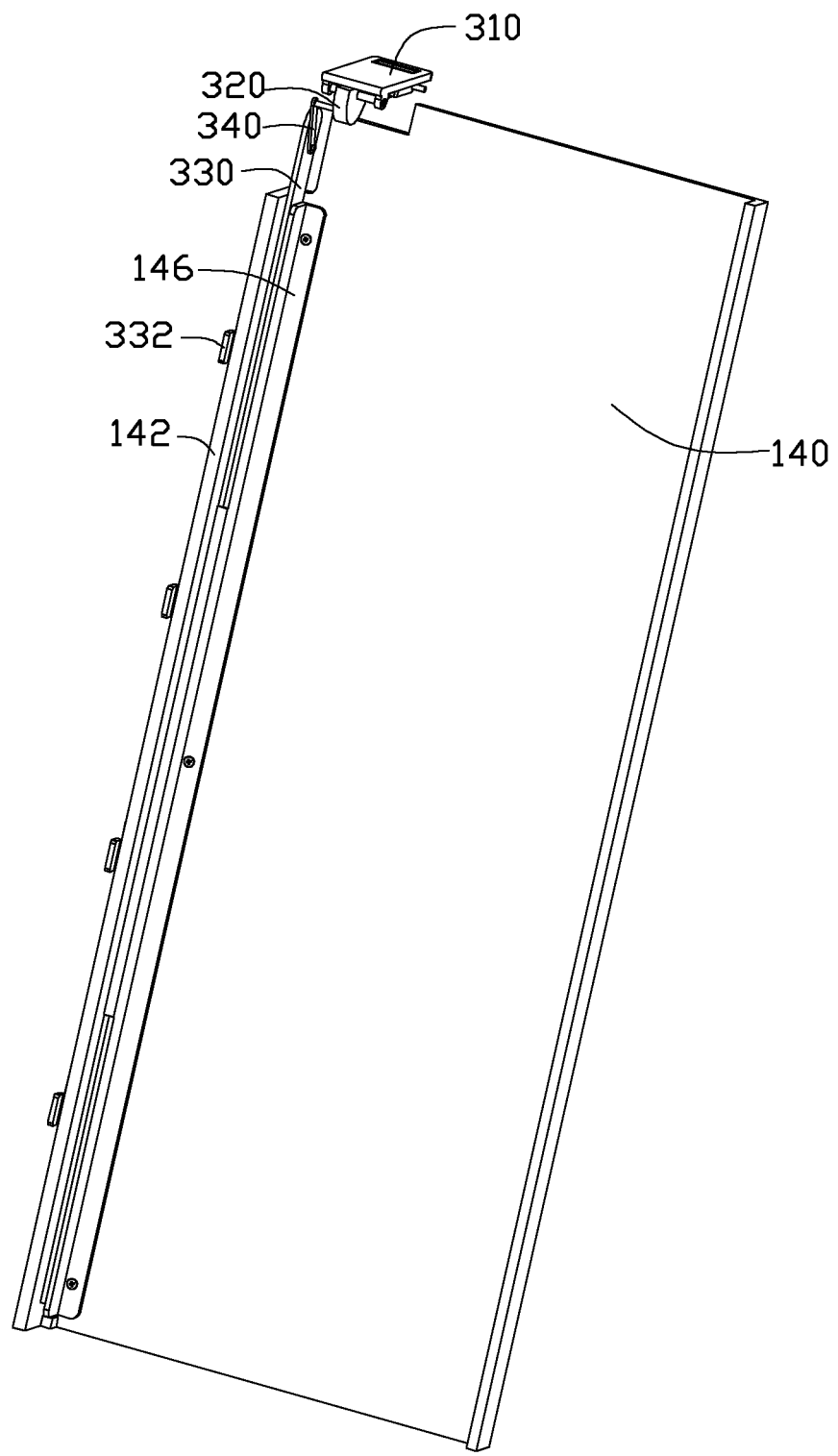
FIG. 5 is a partial, assembled perspective view of the housing shown in FIG. 1.

Referring to FIG. 5, in assembly, the hook portions 332 of the latching member 330 extend through the corresponding elongated holes 144, and the guiding plate 331 resists against the positioning portion 142; the limiting plate 146 resisting against the guiding plate 311 and is further fixed to the fixing plate 140, such that the guiding plate 331 is sandwiched between the positioning portion 142 and the limiting plate 146 and is slidable along the guiding slot cooperatively defined by the positioning portion 142 and the limiting plate 146. The driving member 320 is fixed to the shaft rod 316 and further received in the slot 130 with a portion thereof extending out of the receiving portion 120. The operating member 310 is rotatably coupled to the main body 10 by the shaft rod 316 being rotatably received in the axis holes 122. Opposite ends of the transmitting member 340 are respectively coupled to the first rod 326 and the second rod 3311, whereby the latching member 330 is rotatably coupled to the driving member 320.

To latch the cover 20 to the main body 10: first, the operating member 310 is rotated, such that the free end of the operating member 310 separates from the receiving groove 120, at this time, the driving member 320 rotates in a first direction and drives the guiding plate 331 to slide away from the first sidewall 12, and the hooking portion 332 slides to and against the first end 1442 of the elongated holes 144. Secondly, the hooks 3321 extend through the corresponding wide portions 224, and the protruding posts 230 are received in the corresponding notches of the main body 10. Finally, the operating member 310 is rotated, such that the free end of the operating member 310 is received in the receiving groove 120, at this time, the driving member 320 rotates in a second direction reverse to the first direction and drives the guiding plate 331 to slide toward the first sidewall 12, and hooking portions 332 slide to the second end 1444 of the elongated holes 144, and the connecting plates 3322 slide to and against an end of the narrow portion 222 of the latching holes 220 opposite to the wide portion 224, as a result, the hooks 3321 are locked to the retaining member 210. Therefore, by utilizing the latching mechanism 30, the cover 20 can be latched to the main body 10 easily.

To unlatch the cover 20 from the main body 10: the operating member 310 is rotated to separate the free end of the operating member 310 from the receiving groove 120, at this time, the driving member 320 rotates in a first direction and drives the guiding plate 331 to slide away from the first sidewall 12, and the connecting plate 3322 slide to an end of the wide portion 224 opposite the narrow portion 222. As a result, the hooks 3321 are detachable from the retaining member 210, and the cover 20 can be unlatched from the main body 10.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A housing of an electronic device, comprising:
 a main body comprising a fixing plate, the fixing plate defining at least one elongated hole;
 a cover coverable on the main body, the cover comprising a retaining member, the retaining member defining at least one latching hole corresponding to the at least one elongated hole; and
 a latching mechanism adapted to latch the cover to the main body, the latching mechanism comprising a driving member and a latching member coupled to the driving member, the driving member rotatable about an axis A and capable of driving the latching member sliding between a first position away from the axis A to a second position adjacent to the axis A, the latching member comprising at least one hook portion, the at least one hook portion capable of extending through the at least one elongated hole and the at least one latching hole, and capable of being latched to the at least one elongated hole;
 wherein when the driving member drives the latching member sliding to the first position, the hook portion slides to an end of the at least one latching hole away from the axis A and is detachable from the retaining member, and the cover is unlatched from the main body; when the driving member drives the latching member sliding to the second position, the hook portion slides to the other end of the at least one latching hole adjacent to the axis A and is latched to the retaining member, and the cover is latched to the main body.

2. The housing of claim 1, wherein a first post protrudes from the driving member, and the first post is arranged off-centered relative to the axis A.

3. The housing of claim 2, wherein the latching member is rotatably coupled to the first post.

4. The housing of claim 3, wherein the latching mechanism further comprises an operating member, the operating member is rotatably coupled to the main body and is rotatable around the axis A.

5. The housing of claim 4, wherein the driving member is fixed to the operating member, and is driven to rotate around the axis A when the operating member is rotating.

6. The housing of claim 5, wherein the length of the at least one hook portion is less than that of the at least one elongated hole, and the at least one hook portion is slidable along the at least one elongated hole.

7. The housing of claim 1, wherein the main body further comprises a limiting plate, the limiting plate resists the latching member against the fixing plate.

8. The housing of claim 1, wherein the hook portion comprises a hook and a connecting plate for connecting the hook to the latching member, the connecting plate perpendicular bends from a rim of the latching member, the hook is perpendicularly arranged at an end of the connecting member opposite to the latching member.

9. The housing of claim 8, wherein each latching hole comprising a wide portion away from the axis A and a narrow portion adjacent to the axis.

10. The housing of claim 9, wherein the hook is capable of extending through the wide portion, the connecting plate is slidable from the wide portion to the narrow portion.

11. The housing of claim 10, wherein the width of the narrow portion is less than the width of the hook, and is larger than the thickness of the connecting portion.

12. The housing of claim 11, wherein a plurality of protruding posts protrudes from the cover, the protruding posts are received in the main body and cooperate with the latching mechanism to latch the cover to the main body.

13. The housing of claim 9, wherein the narrow portion is adjacent to the axis A, and the wide portion is away from the axis A.

14. The housing of claim 13, wherein the hook portion slides to an end of the wide portion opposite to the narrow portion when the latching member is driven to slide to the first position, and slides to an end of the narrow portion opposite to the wide portion when the latching member is driven to the second portion.

15. A housing of an electronic device, comprising:
   a main body comprising a fixing plate, the fixing plate defining at least one elongated hole;
   a cover coverable on the main body, the cover comprising a retaining member, the retaining member defining at least one latching hole corresponding to the at least one elongated hole; and
   a latching mechanism adapted to latch the cover to the main body, the latching mechanism comprising a driving member and a latching member coupled to the driving member, the driving member rotatable about an axis A and capable of driving the latching member sliding between a first position away from the axis A to a second position adjacent to the axis A, the latching member comprising at least one hook portion, the at least one hook portion capable of extending through the at least one elongated hole and the at least one latching hole, and capable of being latched to the at least one elongated hole;
   wherein when the driving member drives the latching member sliding to the first position, the hook portion slides to an end of the at least one latching hole away from the axis A and is detachable from the retaining member, and the cover is unlatched from the main body; when the driving member drives the latching member sliding to the second position, the hook portion slides to the other end of the at least one latching hole adjacent to the axis A and is latched to the retaining member, and the cover is latched to the main body; wherein a first post protrudes from the driving member, and the first post is arranged off-centered relative to the axis A; the latching member is rotatably coupled to the first post; wherein the latching mechanism further comprises an operating member, the operating member is rotatably coupled to the main body and is rotatable around the axis A.

16. The housing of claim 15, wherein the driving member is fixed to the operating member, and is driven to rotate around the axis A when the operating member is rotating.

17. The housing of claim 16, wherein the length of the at least one hook portion is less than that of the at least one elongated hole, and the at least one hook portion is slidable along the at least one elongated hole.

18. A housing of an electronic device, comprising:
   a main body comprising a fixing plate, the fixing plate defining at least one elongated hole;
   a cover coverable on the main body, the cover comprising a retaining member, the retaining member defining at least one latching hole corresponding to the at least one elongated hole; and
   a latching mechanism adapted to latch the cover to the main body, the latching mechanism comprising a driving member and a latching member coupled to the driving member, the driving member rotatable about an axis A and capable of driving the latching member sliding between a first position away from the axis A to a second position adjacent to the axis A, the latching member comprising at least one hook portion, the at least one hook portion capable of extending through the at least one elongated hole and the at least one latching hole, and capable of being latched to the at least one elongated hole;
   wherein when the driving member drives the latching member sliding to the first position, the hook portion slides to an end of the at least one latching hole away from the axis A and is detachable from the retaining member, and the cover is unlatched from the main body; when the driving member drives the latching member sliding to the second position, the hook portion slides to the other end of the at least one latching hole adjacent to the axis A and is latched to the retaining member, and the cover is latched to the main body; wherein the hook portion comprises a hook and a connecting plate for connecting the hook to the latching member, the connecting plate perpendicular bends from a rim of the latching member, the hook is perpendicularly arranged at an end of the connecting member opposite to the latching member.

19. The housing of claim 18, wherein each latching hole comprises a wide portion away from the axis A and a narrow portion adjacent to the axis.

20. The housing of claim 19, wherein the hook is capable of extending through the wide portion, the connecting plate is slidable from the wide portion to the narrow portion.

* * * * *